(12) United States Patent
Mantua et al.

(10) Patent No.: US 7,977,591 B2
(45) Date of Patent: Jul. 12, 2011

(54) LIQUID LEVEL MONITOR INCLUDING ELECTROMECHANICAL FLOAT SWITCH HAVING REDUCED LIQUID MIGRATION INTO THE SWITCH

(75) Inventors: Mark A. Mantua, Freeport, IL (US); Brad L. Cummins, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 345 days.

(21) Appl. No.: 12/369,323

(22) Filed: Feb. 11, 2009

(65) Prior Publication Data

US 2010/0200082 A1 Aug. 12, 2010

(51) Int. Cl.
*H01H 35/18* (2006.01)
(52) U.S. Cl. .................................................. 200/84 R
(58) Field of Classification Search ............... 340/450.3, 340/623, 693, 619, 624; 60/534, 535, 585, 60/592; 200/84 R, 84 A, 84 B, 61.2; 73/308, 73/322.05, 305, 309, 313, 290 R, 293
See application file for complete search history.

(56) References Cited

U.S. PATENT DOCUMENTS

| | | | | |
|---|---|---|---|---|
| 3,931,485 A | * | 1/1976 | Spielfiedel et al. | 200/84 R |
| 4,038,507 A | * | 7/1977 | Murphy et al. | 200/84 R |
| 4,047,048 A | * | 9/1977 | Demido | 307/118 |
| 4,318,078 A | * | 3/1982 | Reinartz et al. | 340/450.1 |
| 4,487,021 A | * | 12/1984 | Arakawa et al. | 60/534 |
| 4,500,761 A | * | 2/1985 | Kubota et al. | 200/84 C |
| 5,244,059 A | | 9/1993 | McLaughlin | |
| 6,941,808 B2 | * | 9/2005 | Gouzou et al. | 73/313 |

* cited by examiner

*Primary Examiner* — Michael A Friedhofer
(74) *Attorney, Agent, or Firm* — Ingrassia Fisher & Lorenz, P.C.

(57) ABSTRACT

A liquid level monitor (100) includes a liquid bowl cavity (102) having a liquid sampling port (106). A switching device cavity (104) is formed within an upper portion of the housing (105) having an electromechanical switching device (112) therein. A separator (116) is between the liquid bowl cavity (102) and the switching device cavity (104). A venting pathway (120) including a vent passage (122) is for equalizing pressure between a region over the liquid in the liquid bowl cavity (102) and the switching device cavity (104). A liquid level indicator including a float (131) is positioned in the liquid bowl cavity (102) for indicating the height of the liquid. The liquid level indicator (131) actuates the electromechanical switching device (112) when the fluid level falls below a predetermined level. A mechanical barrier (115) is positioned in the venting pathway (120) for redirecting liquid back into the liquid bowl cavity (102).

14 Claims, 6 Drawing Sheets

TO FLUID RESERVOIR
OF COMPRESSION
COMPRISING SYSTEM

LIQUID LEVEL MONITOR INCLUDING ELECTROMECHANICAL FLOAT SWITCH HAVING REDUCED LIQUID MIGRATION INTO THE SWITCH

FIELD

Embodiments of the present invention relate generally to liquid level monitors that include electronic comprising switches, such as oil level monitors and oil switches.

BACKGROUND

For systems that include compressors, pistons must be properly lubricated during operation to reduce wear and avoid damage. For example, oil stored in a crank case is generally used for the lubrication function. If the oil level falls to a level that is too low to provide proper lubrication, damage may result from operation.

Liquid level monitors are known. An oil level monitor can be used to sense a low oil level and send a signal to identify the condition or disable or otherwise shut down the system if too low a level is reached. The operable signal from the oil level monitor can be communicably coupled (e.g. wired) to flash a warning light, sound a howler, shut off electrical power to the system, or send signal a detection signal to a supervisory computer. Such oil level monitors generally need to be compact, low cost and reliable.

For example, one known oil monitor comprises a magnetic reed switch. The liquid to be monitored, such as oil, is piped directly into the monitor through a small metal tube into the float chamber. A float carries a ring magnet inside the chamber and moves up and down on a central pipe which encloses a magnetic reed switch. When the oil level recedes, the float is lowered and the magnet actuates the reed switch at a predetermined level. Although the magnetic reed switch is not susceptible to oil contamination, reed switches typically can not handle the high electrical current and voltage requirements of conventional industrial applications that oil monitors are generally used in.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims. Embodiments of the present invention describe liquid level monitors and switches including an electronic float switch, wherein the monitor or switch has at least one structure for reducing liquid migration into the electronic switch.

Liquid level monitors or switches according to embodiments of the invention utilize both a liquid bowl cavity and switching device cavity above the liquid bowl cavity having an electromechanical switching device therein, and a venting pathway between the respective cavities for equalizing the pressure between the cavities. The Present Inventors have discovered that under certain conditions, particularly when compression in the system being monitored begins and a pressure above atmospheric pressure may be generated, the venting pathway which is coupled to receive the pressure above the liquid in the system being monitored can result in migration of liquid from the liquid bowl cavity into the switching device cavity. Liquid in the switching device cavity has been found to render the electronic portion of the electromechanical switching device unreliable or even inoperable, particularly in the case of conventional non-encapsulated electromechanical switching devices. As used herein, an electromechanical switching device is a device which includes a switch which makes or breaks an electrical circuit when a mechanical force is applied to the actuating member, lever or plunger of the switch.

For example, in the case the liquid is oil, oil can degrade the function of the electromechanical switching device, such as when it reaches and coats the electrical contact regions due to the dielectric character of oil. Embodiments of the invention provide at least one structure that prevents or at least significantly reduces liquid migration into the switching cavity, by blocking and/or redirecting migrating liquid that would otherwise reach the switching cavity, and thus helps prevent degradation of the switching function.

A liquid level monitor according to an embodiment of the invention comprises a generally hollow outer housing, a liquid bowl cavity in a lower portion of the housing having a fluid sampling port for fluid coupling to a liquid reservoir of a compression comprising system. The liquid reservoir has a fluid therein and an air portion above the liquid. The liquid in the liquid bowl cavity is at a level that tracks a height of the liquid in the fluid reservoir. A switching device cavity is formed within an upper portion of the housing having an electromechanical switching device therein. A separator is interposed between the liquid bowl cavity and the switching device cavity. The separator sealably divides the respective cavities. The switching device cavity includes a venting pathway comprising a vent passage that has an air sampling port for coupling to the air portion in the liquid reservoir. The vent passage equalizes pressure between a region over the fluid in the liquid bowl cavity and the switching device cavity.

A liquid level indicator comprising a float is positioned in the liquid bowl cavity. The float is attached to a float stem which extends through the separator into the switching device cavity and is operable to actuate the electromechanical switching device when the liquid level falls below a predetermined level. A mechanical barrier is positioned in the venting pathway. When liquid migrates into the vent passage from the liquid bowl cavity, the mechanical barrier is operable for redirecting at least a portion of the liquid back into the liquid bowl cavity.

DETAILED DESCRIPTION

Figure 1A:
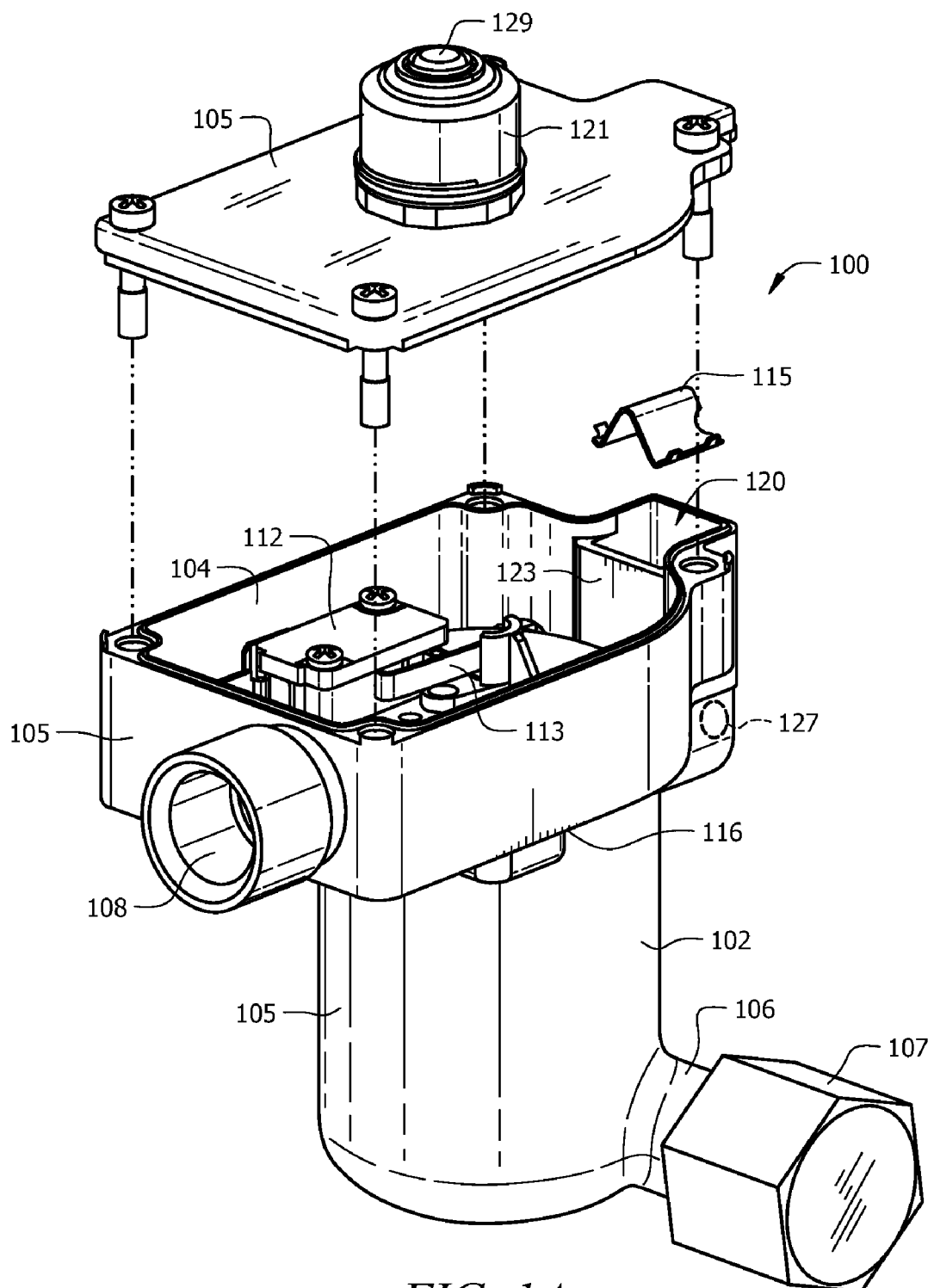
FIG. 1A shows a partial exploded view of a liquid level monitor having a mechanical barrier for positioning in the venting pathway for redirecting liquid from the liquid bowl cavity back into the liquid bowl cavity, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1A shows a partial exploded view of a liquid level monitor 100 having a mechanical barrier 115 for positioning in the venting pathway 120 for redirecting liquid that attempts to escape from the liquid bowl cavity 102 via the venting pathway 120 to the switching device cavity 104, back into the liquid bowl cavity 102, according to an embodiment of the invention. Liquid level monitor 100 comprises a generally hollow outer housing 105. Liquid bowl cavity 102 is positioned in a lower portion of housing 105, while switching device cavity 104 is positioned in the upper portion of housing 105.

Housing 105 is shown in FIG. 1A also including an optional access region 108 for coupling electrical connectors (e.g. flex conduit; not shown) to the electromechanical switching device 112. In the embodiment shown, electromechanical switching device 112 when actuated by a low liquid level can disable electrical power or otherwise shut down the compression comprising system if too low a liquid level is reached. Alternatively, the operable signal from electromechanical switching device 112 can initiate an alert such as the flashing of a warning light (not shown), sounding of a howler (not shown), or the sending a signal to a supervisory computer.

The top of the housing 105 also includes a reset switch 121 having a reset button 129. The reset switch 121 is operable to allow the electromechanical switching device 112 to complete the circuit to again provide electrical power to the compression comprising system, such as after fluid such as oil is added to restore a proper liquid level for operation of the compression comprising system being monitored by liquid level monitor 100.

Liquid bowl cavity 102 includes a liquid sampling port 106 having a fitting 107 thereon for fluid coupling to the liquid reservoir (e.g. crank case) of a compression comprising system, such as a motor or engine (not shown). The liquid reservoir (not shown) has a liquid therein and an air portion above the liquid. The liquid level monitor 100 is generally installed and secured to be at a height so that the fluid in said liquid bowl cavity 102 is at a height (e.g. the same height) that tracks a height of the liquid in the liquid reservoir (not shown).

A separator 116 is interposed between the liquid bowl cavity 102 and the switching device cavity 104 for sealably dividing the respective cavities. Venting pathway 120 vent capping structure 123 and an air sampling port 127 for coupling to the air portion in the liquid reservoir. Venting pathway 120 is for equalizing pressure between a region over the liquid in the liquid bowl cavity 102 and the switching device cavity 104.

Mechanical barrier 115 can be positioned in vent capping structure 123. Mechanical barrier 115 can be secured in the vent capping structure 123 by a press fit, one or more screws, or be secured within the vent passage 122 (see FIG. 1B) which is below the vent capping structure 123. As described above, when the liquid migrates into the venting pathway 120 from the liquid bowl cavity 102 the mechanical barrier 115 is operable for redirecting at least a portion of the fluid back into the liquid bowl cavity 102. Mechanical barrier 115 generally does not provide a seal. Rather, mechanical barrier 115 generally occupies at least 80% of the cross sectional area of the portion of venting pathway 120 in which it is positioned, and generally occupies at least 90% of such cross sectional area.

Figure 1B:
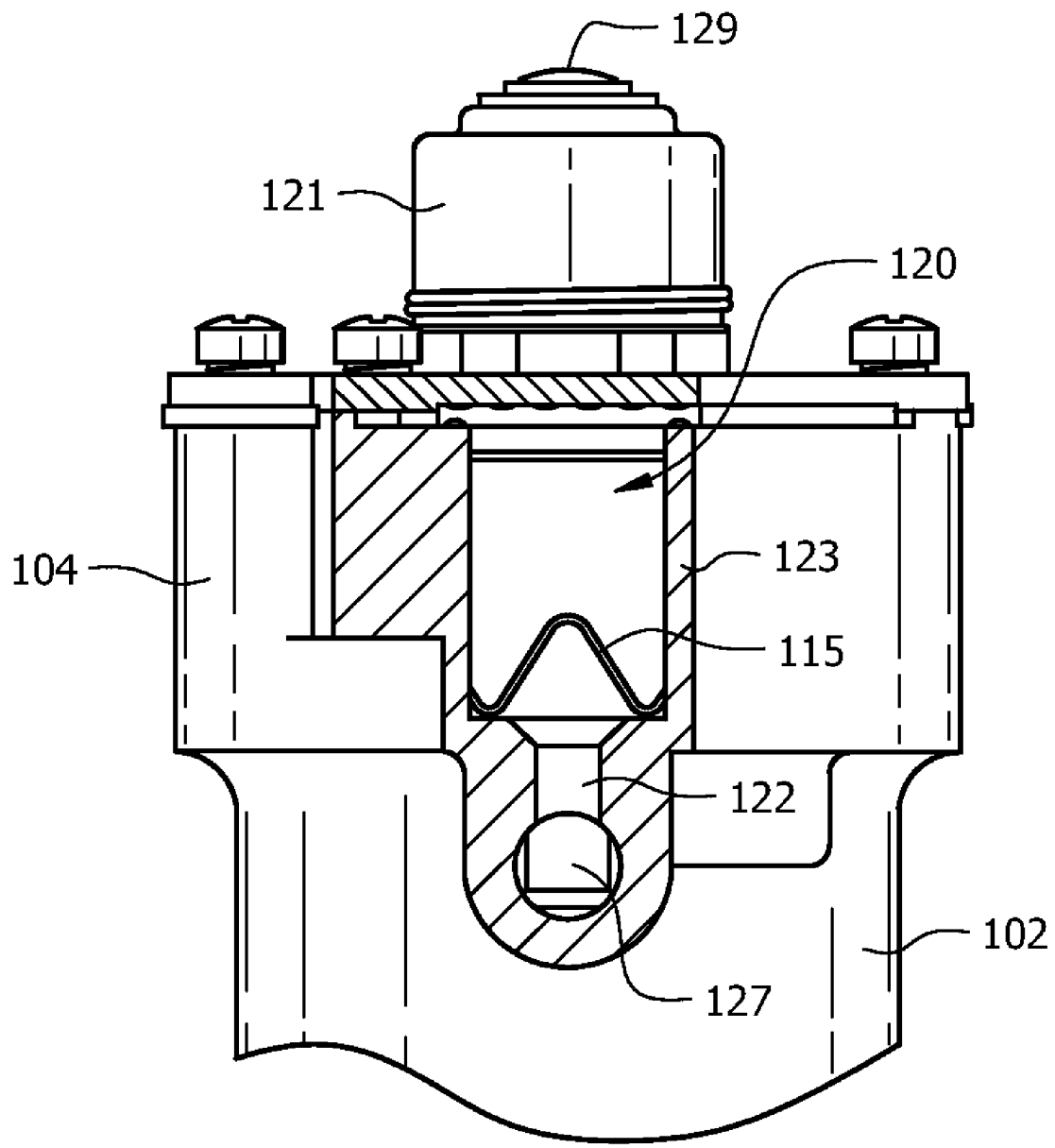
FIG. 1B shows a depiction of a portion of a liquid level monitor having a mechanical barrier embodied as a baffle positioned in the venting pathway over the vent passage for redirecting liquid from the liquid bowl cavity back into the liquid bowl cavity, according to an embodiment of the invention.

FIG. 1B shows a depiction of a portion of a liquid level monitor having a mechanical barrier 115 embodied as a baffle positioned above the vent passage 122 in the bottom portion of the vent capping structure 123 for redirecting liquid from the liquid bowl cavity 102 back into the liquid bowl cavity, according to an embodiment of the invention. Mechanical barriers 115, such as baffles, can be fabricated using a variety of techniques from materials such as sheet metal blanks. Vent capping structure 123 has a cross sectional area that is generally significantly (>2×) greater than the cross sectional area of the vent passage 122.

Figure 2A:
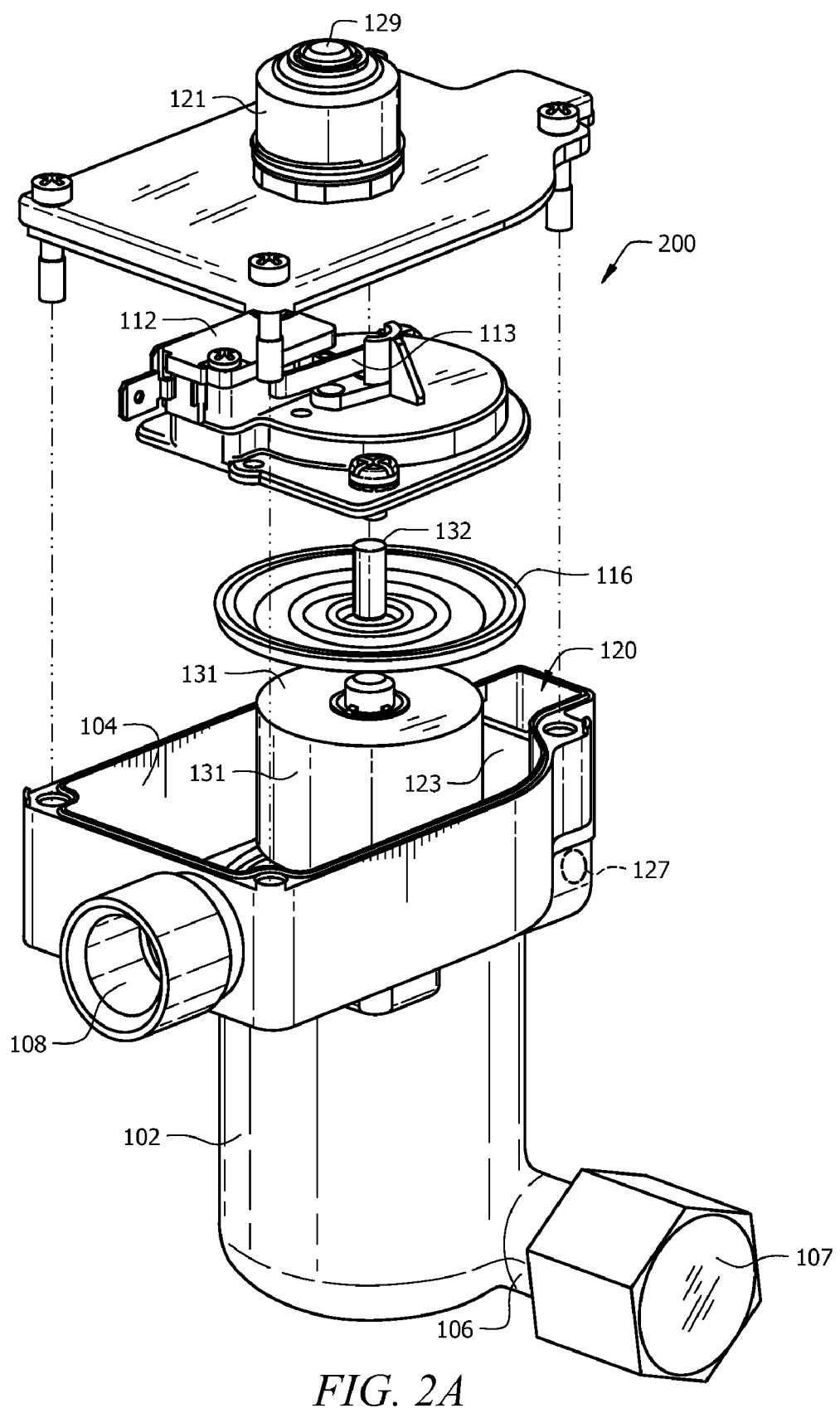
FIG. 2A shows a partially exploded view of a liquid level monitor having a corrugated diaphragm for separating the liquid bowl cavity and switching device cavity according to an embodiment of the invention.

FIG. 2A shows a partially exploded view of a liquid level monitor 200 having a separator 116 embodied as a corrugated (e.g. having ridges and troughs) deformable diaphragm for sealably separating the liquid bowl cavity 102 and switching device cavity 104 according to an embodiment of the invention. Such a corrugated diaphragm can be manufactured using an injection molding process. Float 131 is shown coupled to float stem 132 which actuates electromechanical switching device 112.

In one embodiment, deformable diaphragm has a thickness <50 mils (1.27 mm), such as <25 mils (0.64 mm), and is formed from an elastic material (e.g. an elastomer such as a rubber). A diaphragm when flexed in liquid level monitors according to embodiments of the invention have been found to provide the advantage of applying a return spring force to the float 131 and float stem 132 (shown below) which has been found to provide float stem fluctuation dampening which generally results in more repeatable low liquid level signaling, particularly under liquid (e.g. oil) level variation due to cycling of the monitored device. Adding corrugation allows the diaphragm 116 to straighten out when stressed, which provides a lower force effect on the movement of the float 131 resulting in a greater movement and better sensitivity to the oil level changes. In one embodiment, the diaphragm 116 is positioned so that its static installed height corresponds to a low signal point of the liquid, and is operable for creating a return spring force when the level is in a proper predetermined run range. This force will help overcome any mechanical friction or impedance to the movement of the float 131 and float stem 132 as it reacts to changing oil level and moves back to the low oil level position.

Figure 2B:
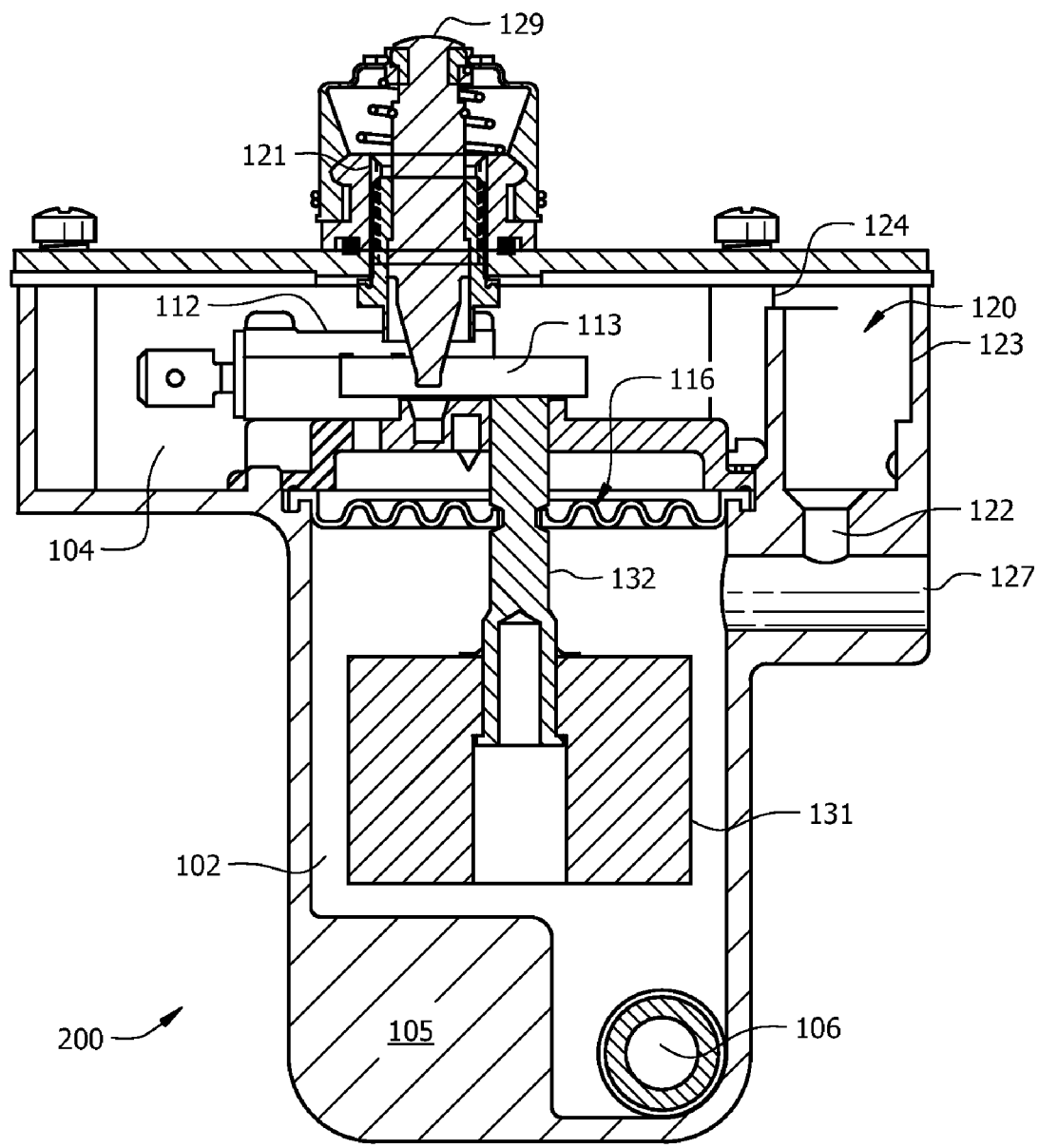
FIG. 2B shows a cross sectional depiction of a liquid level monitor having a corrugated diaphragm seal for separating the liquid bowl cavity and switching device cavity according to an embodiment of the invention.

FIG. 2B shows a cross sectional depiction of liquid level monitor 200 shown in FIG. 2A. Float stem 132 is seen to extend into switching device cavity 104. In typical operation, when the liquid level in liquid bowl cavity 102 falls sufficiently, float 131 moves down thus moving float stem 132 away from arm 113 of electromechanical switching device 112 causing spring loaded arm 113 to move which results in electromechanical switching device changing states (e.g. closed to open). Vent capping structure 123 can be seen in FIG. 2B to include a narrow (e.g. about 0.100 inches or 0.3 cm) opening 124 near the top of the housing 105 which acts as a secondary mechanism for preventing liquid from reaching electronic device cavity 104.

Figure 3A:
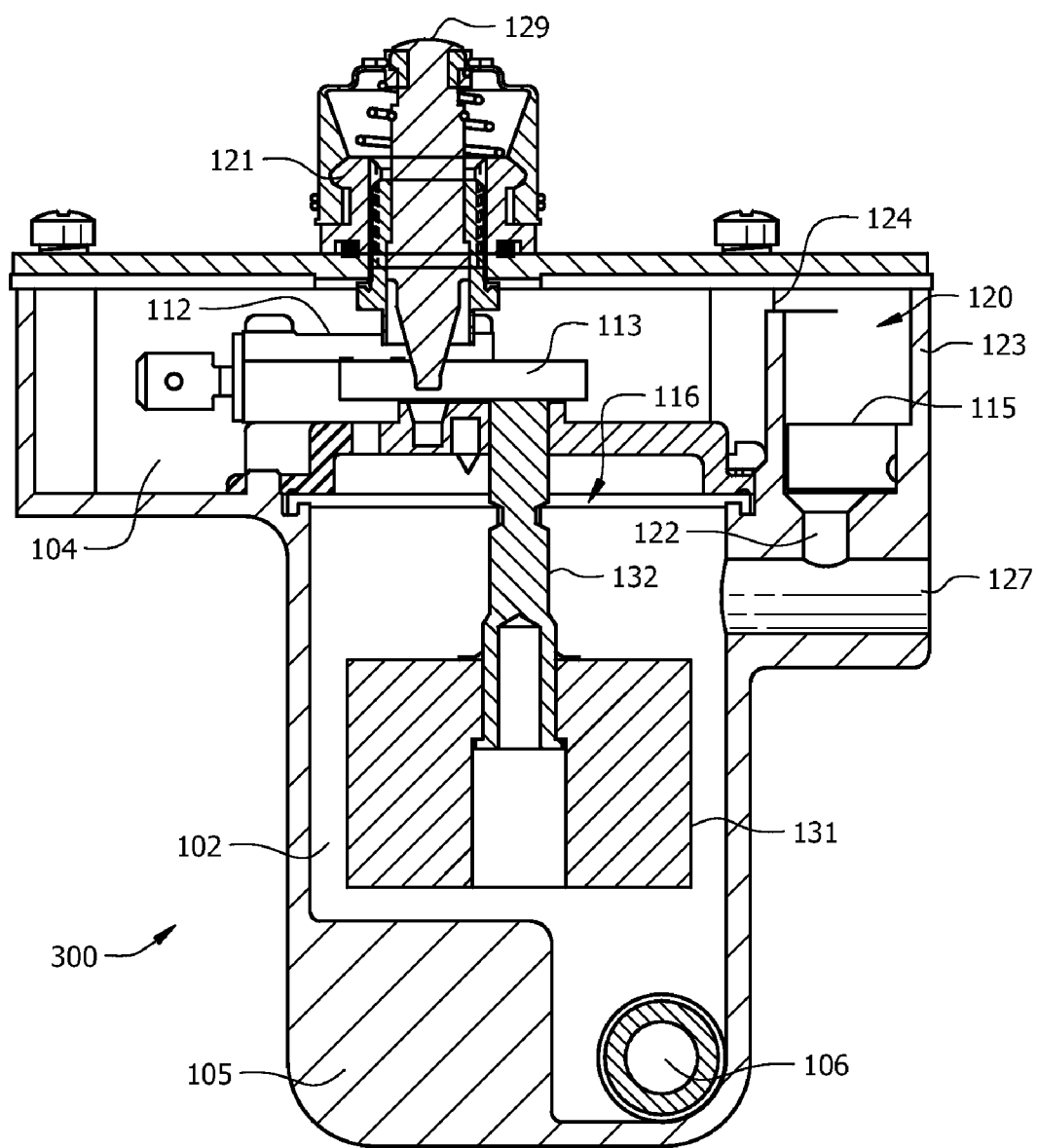
FIG. 3A shows a cross sectional depiction of an exemplary liquid level monitor having a diaphragm separating the liquid bowl cavity and switching device cavity according to an embodiment of the invention.

FIG. 3A shows a cross sectional depiction of an exemplary liquid level monitor 300 having a separator 116 comprising an essentially planar diaphragm 116 for separating the liquid bowl cavity 102 and the switching device cavity 104 according to an embodiment of the invention.

Figure 3B:
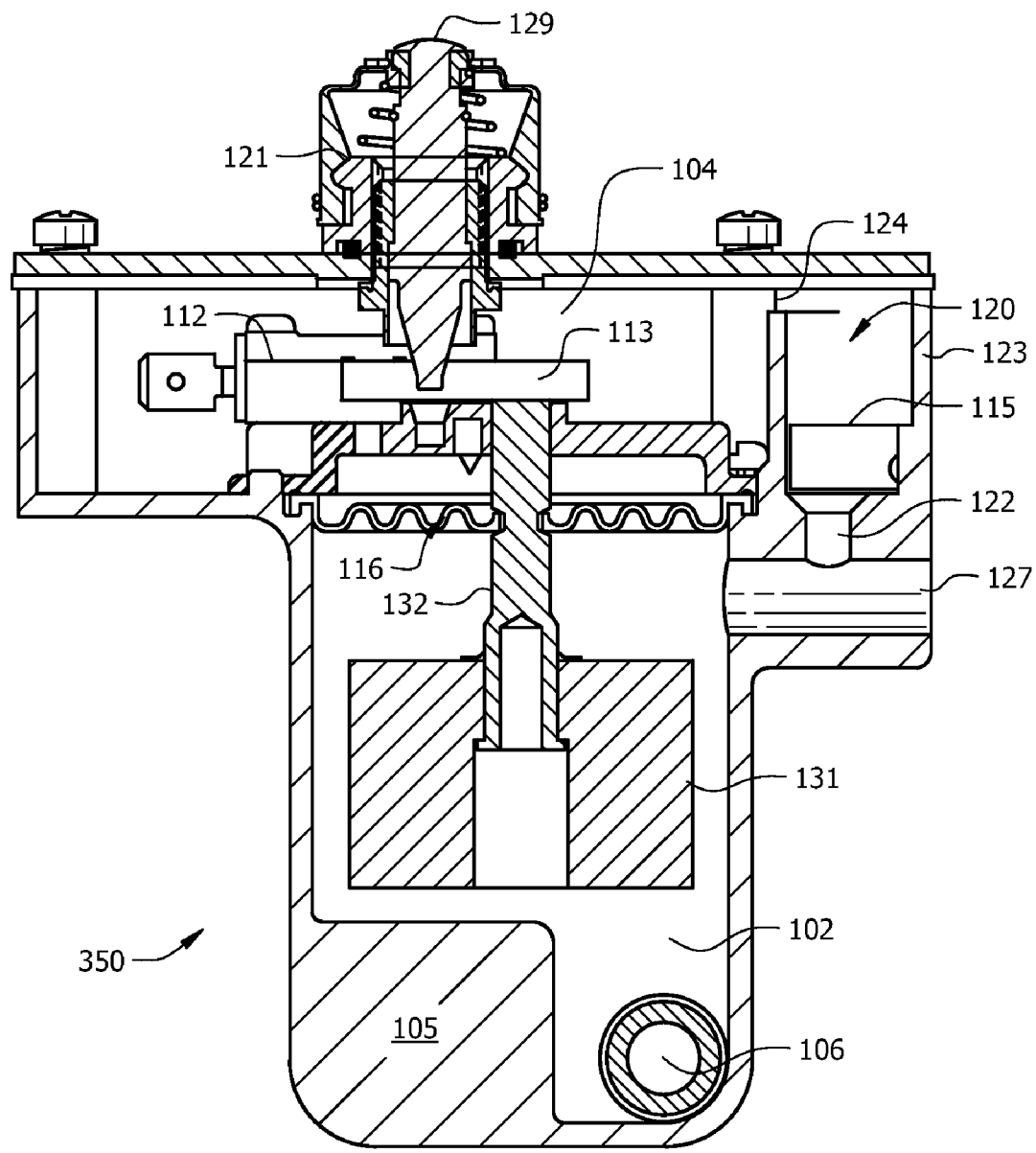
FIG. 3B shows a cross sectional depiction of an exemplary liquid level monitor having a barrier embodied as a baffle positioned over the vent passage for redirecting liquid from the liquid bowl cavity back into the liquid bowl cavity and a corrugated diaphragm for separating the liquid bowl cavity and switching device cavity, according to an embodiment of the invention.

FIG. 3B shows a cross sectional depiction of an exemplary liquid level monitor 350 having a barrier embodied as a baffle 115 positioned in the vent capping structure 123 over the vent passage 122 for redirecting liquid from the liquid bowl cavity 102 back into the liquid bowl cavity 102, according to an embodiment of the invention. Liquid level monitor 350 also comprises a separator 116 comprising a corrugated diaphragm separating the liquid bowl cavity 102 and switching device cavity 104.

Liquid level monitors and liquid level float switches according to embodiments of the invention are well suited for monitoring the oil level in large bearings, gear cases, transformers, circuit breakers, unattended automated plants, refill oil tanks, replenish cutting oil on screw machines and many other applications. In one particular application, an oil level float switch according to an embodiment of the invention is used for monitoring the oil level in the crank case of an air compressor comprising an electric motor. In another particular application, an oil level float switch according to an embodiment of the invention is used for monitoring the oil level in the crank case of an internal combustion engine, where the electromechanical switching device cuts off ignition if the oil level becomes too low.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A liquid level monitor, comprising:
an outer housing;
liquid bowl cavity in a lower portion of said housing having a liquid sampling port for fluid coupling to a liquid reservoir of a compression comprising system, said liquid reservoir having a liquid therein and an air portion above said liquid, said liquid in said liquid bowl cavity being at a level that tracks a height of said liquid in said liquid reservoir;
a switching device cavity formed within an upper portion of said housing having an electromechanical switching device therein;
a separator interposed between said liquid bowl cavity and said switching device cavity;
a venting pathway comprising a vent passage having an air sampling port for coupling to said air portion in said fluid reservoir, said vent passage for equalizing pressure between a region over said liquid in said liquid bowl cavity and said switching device cavity;
a liquid level indicator comprising a float positioned in said liquid bowl cavity for indicating said height of said liquid in said fluid reservoir, said liquid level indicator for actuating said electromechanical switching device when said level falls below a predetermined level, and
a mechanical barrier positioned in said venting pathway, wherein when said fluid migrates into said vent passage from said liquid bowl cavity said mechanical barrier is operable for redirecting at least a portion of said liquid back into said liquid bowl cavity.

2. The liquid level monitor of claim 1, wherein said liquid level indicator comprises a float stem secured to said float having a portion extending through an aperture formed in said separator.

3. The liquid level monitor of claim 2, wherein said separator comprises a deformable diaphragm having a thickness <25 mils, further wherein said diaphragm is formed from an elastic material and provides said aperture.

4. The liquid level monitor of claim 3, wherein said deformable diaphragm comprises a corrugated surface.

5. The liquid level monitor of claim 3, wherein said deformable diaphragm is positioned so that its static installed height corresponds to a low signal point of said liquid, and is operable for creating a return spring force when said level is in a predetermined run range.

6. The liquid level monitor of claim 1, wherein said mechanical barrier comprises a baffle that is shaped for said redirecting.

7. The liquid level monitor of claim 1, wherein said venting pathway further comprises a vent capping structure having a cross sectional area greater than said vent passage, said vent capping structure providing a narrow opening near a top of said housing.

8. An oil level switch, comprising:
an outer housing;
an oil bowl cavity positioned in a lower portion of said housing having a fluid sampling port for fluid coupling to a crank case of a compression comprising system, said crank case having oil therein and an air portion above said oil, wherein said oil in said oil bowl cavity is at a height that tracks a height of said oil in said crank case;
a switching device cavity formed within an upper portion of said housing having an electromechanical switching device therein;
a separator interposed between said oil bowl cavity and said switching device cavity;
a vent passage having an air sampling port for coupling to said air portion in said crank case, said vent passage for equalizing pressure between a region over said height in said oil bowl cavity and said switching device cavity;
an oil level indicator comprising a float positioned in said oil bowl cavity for indicating said height of said oil in said crank case, said oil level indicator for actuating said electromechanical switching device when said level falls below a predetermined level, and
a mechanical barrier positioned in or over said vent passage, wherein when said oil migrates into said vent passage from said oil bowl cavity said mechanical barrier is operable for redirecting at least a portion of said oil back into said oil bowl cavity.

9. The oil level switch of claim 8, wherein said oil level indicator comprises a float stem secured to said float having a portion extending through an aperture formed in said separator.

10. The oil level switch of claim 8, wherein said separator comprises a deformable diaphragm having a thickness <25 mils, further wherein said diaphragm is formed from an elastic material and provides said aperture.

11. The oil level switch of claim 10, wherein said deformable diaphragm comprises a corrugated surface.

12. The oil level switch of claim 10, wherein said deformable diaphragm is positioned so that its static installed height corresponds to a low signal point of said liquid, and is operable for creating a return spring force when said level is in a predetermined run range.

13. The oil liquid level switch of claim 8, wherein said mechanical barrier comprises a baffle that is shaped for said redirecting.

14. The oil level switch of claim 8, wherein said venting pathway further comprises a vent capping structure having a cross sectional area greater than said vent passage, said vent capping structure providing a narrow opening near a top of said housing.

* * * * *